United States Patent [19]

Ante et al.

[11] 4,436,049
[45] Mar. 13, 1984

[54] SIMULATOR FOR TESTING SONOBUOYS

[75] Inventors: Louis E. Ante; Richard A. Lindquist; Eugene R. Roeschlein, all of Indianapolis, Ind.

[73] Assignee: The United States of America as represented by the Secretary of the Navy, Washington, D.C.

[21] Appl. No.: 380,152

[22] Filed: May 20, 1982

[51] Int. Cl.³ .................... B63B 21/16; B63B 21/52
[52] U.S. Cl. ......................... 114/254; 73/432 SD; 441/21
[58] Field of Search .................. 367/3, 4, 5, 13, 130; 114/235, 242, 243, 244, 245, 253, 268; 440/33, 34; 441/1, 11, 21, 23; 73/170 A, 432 SD, 432 K

[56] References Cited

U.S. PATENT DOCUMENTS

| 1,187,179 | 6/1916 | Robeson . | |
|---|---|---|---|
| 1,569,910 | 1/1926 | Bohannon | 440/34 |
| 3,012,534 | 12/1961 | Thomas | 114/235 |
| 3,144,848 | 8/1964 | Knott et al. | 114/235 |
| 3,469,551 | 9/1969 | Lefebvre | 114/235 |
| 3,536,298 | 10/1970 | Deslierres | 114/244 |
| 3,541,498 | 11/1970 | Dale et al. | 441/33 |
| 4,271,550 | 6/1981 | Joubert et al. | 114/242 |

Primary Examiner—Trygve M. Blix
Assistant Examiner—Edwin L. Swinehart
Attorney, Agent, or Firm—Robert F. Beers; Paul S. Collignon

[57] ABSTRACT

Apparatus is provided for simulating an ocean environment for sonobuoys which are being tested in a relatively calm body of water. A floating platform is towed through water to simulate a sea current, and a sonobuoy being tested is attached by a cable to the floating platform. A drum, driven by a reversible motor, winds and unwinds the cable to simulate wave action while the floating platform is being towed.

2 Claims, 3 Drawing Figures

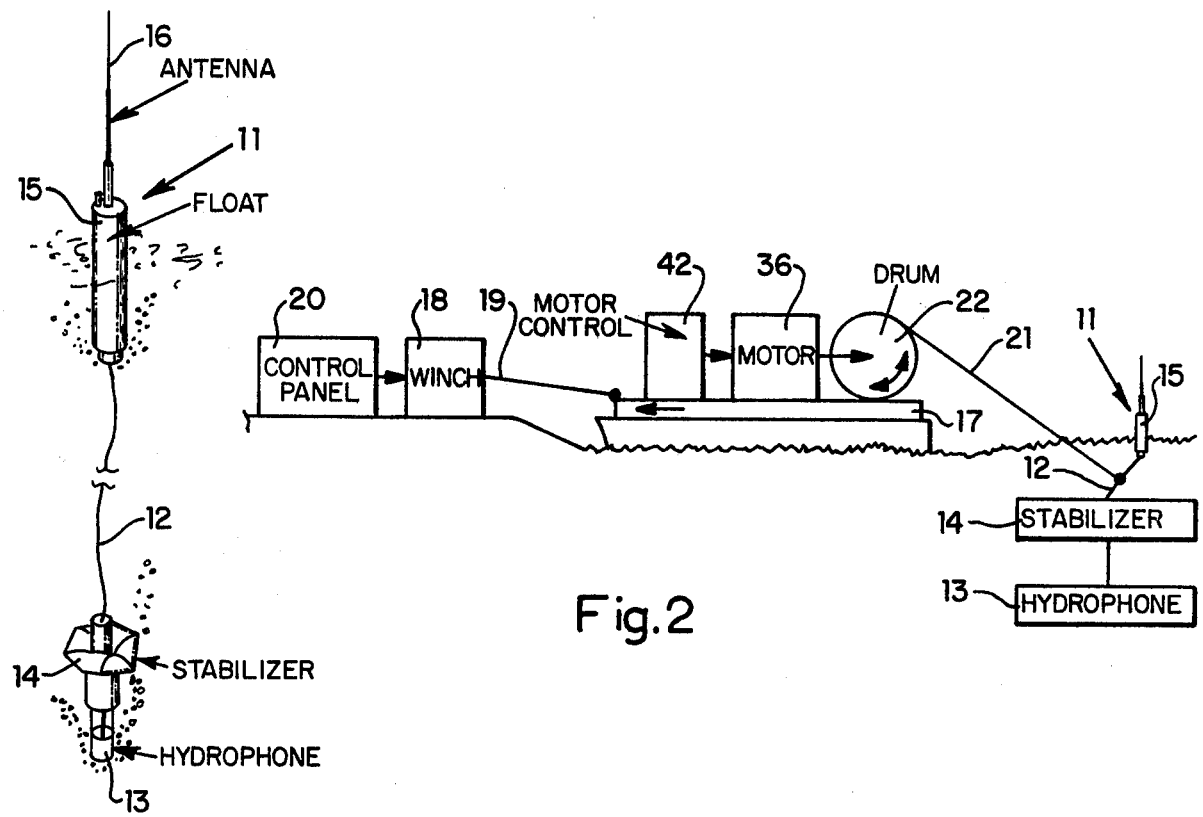
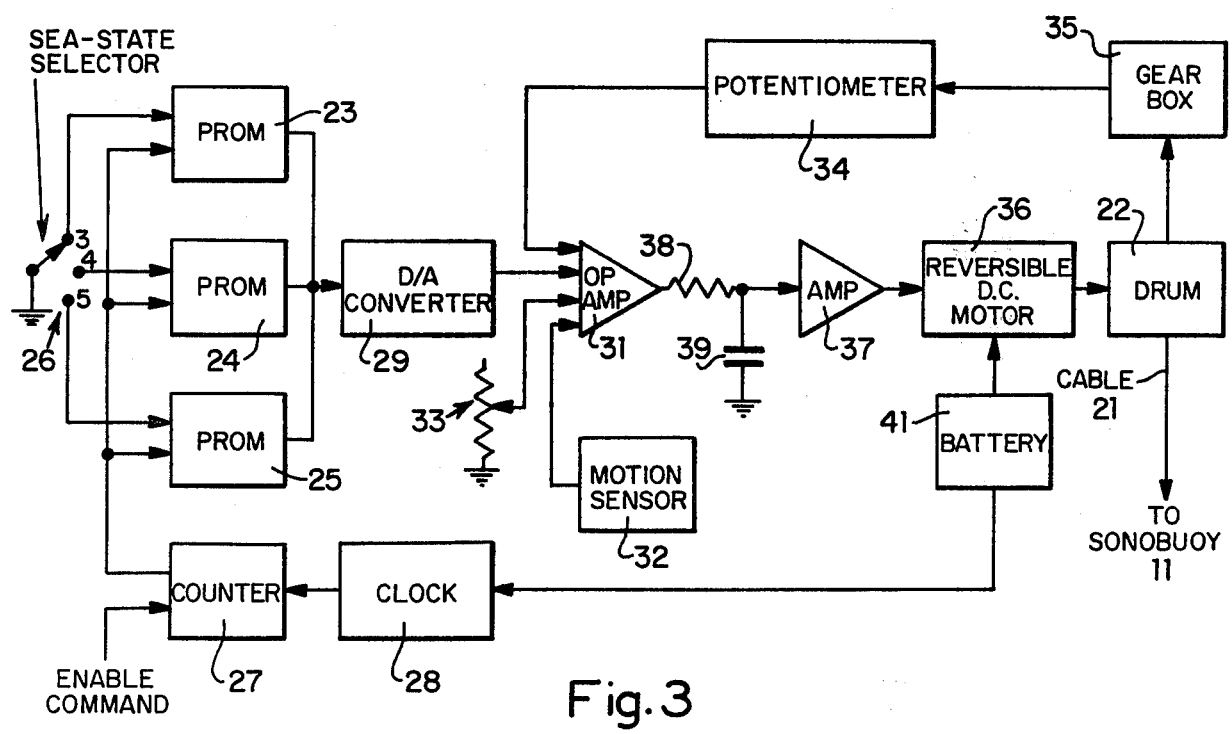

SIMULATOR FOR TESTING SONOBUOYS

BACKGROUND OF THE INVENTION

The present invention relates to apparatus for testing sonobuoys and more particularly to apparatus for simulating sea current and wave motion while a sonobuoy is operating in a relatively calm body of water.

In the past, one method of imparting motion to a sonobuoy being operated in a relatively calm body of water was by the use of mechanical cams and linkage to cause the sonobuoy to move in a vertical direction. The motion, however, was generally sinusoidal and did not closely simulate motion of the sea which is a combination of sea current and waves. Also, the cams and linkage produced considerable noise which was picked-up by the hydrophone being tested.

SUMMARY OF THE INVENTION

The present invention relates to a sea state and sea current simulator for testing a sonobuoy operating in a relatively calm body of water, such as a lake. Sea current is simulated by pulling a floating platform through the water by using a winch which is stationed on shore. A sonobuoy being tested is attached to the floating platform by a cable. A drum, rotatably mounted on the floating platform and driven by a reversible motor, winds and unwinds the cable going to the sonobuoy and imparts vertical motion to the hydrophone of the sonobuoy similar to motion caused by ocean waves.

Various sea states can be simulated by storing in separate programmable read-only memories (PROMs) digital representations of amplitudes. An output from a selected PROM is converted to an analog voltage, and a control unit cycles the reversible motor in a manner to simulate the desired sea state.

It is therefore a general object of the present invention to provide a simulator for imparting both horizontal and vertical motions to a sonobuoy being tested in a relatively calm body of water.

Another object of the present invention is to provide a simulator which will simultaneously duplicate sea current and wave motion.

Other objects and advantages of the present invention will become readily apparent from the following detailed description of the invention when considered in conjunction with the accompanying drawing.

BRIEF DESCRIPTION OF THE DRAWING

FIG. 1 is a perspective view showing major components of a sonobuoy;

FIG. 2 is a block diagram of a preferred embodiment of the present invention; and FIG. 3 is a block diagram showing a manner of programming a reversible motor to impart motion to a cable attached to a sonobuoy.

DESCRIPTION OF THE PREFERRED EMBODIMENT

FIG. 1 of the drawing shows the major components of a sonobuoy 11, which would normally be deployed from an aircraft by means of either a rotochute or a parachute. After sonobuoy 11 is in the water, a long cable 12 is played-out to deploy a hydrophone 13 at a predetermined depth. A stabilizer 14 is also provided at the end of cable 12 adjacent hydrophone 13. A float 15, which contains transmitting equipment and an antenna 16, supports hydrophone 13, and float 15 is subjected to the wave and current motion of the sea. Float 15, in turn, imparts its motion to hydrophone 13, and it is this motion which is to be simulated when testing a sonobuoy in a relatively calm body of water, such as a lake.

Referring now to FIG. 2 of the drawing, a system is shown for testing a sonobuoy 11 wherein both wave action and sea current are simultaneously simulated. A floating platform 17 is pulled at a predetermined speed by a winch 18, which is placed on shore, to simulate sea current. A control panel 20 is provided to control the speed of winch 18. A very long cable 19 is played-out, and is rewound onto winch 18 to simulate sea current. Sonobuoy 11, which is being tested, is attached by cable 21 to a drum 22 which is rotatably mounted on platform 17 and sonobuoy 11 is towed through the water to simulate sea current. Drum 22 is oscillated so that cable 21 is raised and lowered thereby simulating wave action.

Referring now to FIG. 3 of the drawing, there is shown an arrangement for controlling the oscillation of drum 22 so that a desired sea state is simulated. The arrangement is capable of simulating three sea states, that is, sea-states 3, 4, and 5, however, if desired, additional sea-states might be simulated. Sea-state numbers have been assigned for various conditions and a sea-state 3 condition has waves which are 4 feet high, sea-state 4 condition has waves which are 8 feet high and sea-state condition 5 has waves which are 12 feet high. Three programmable read-only memories (PROMs) 23, 24, and 25 are programmed to digitally represent three sea-state conditions 3, 4, and 5, respectively and a selector switch 26 is provided for selecting a desired sea state. Each PROM can contain many thousands of digital words, each representing an amplitude which has been determined in advance. Also, each PROM contains a number of test sequences of desired length in time, such as a time of 1000 seconds. A 10-bit binary counter 27 and clock 28 are provided for addressing the three PROMs 23, 24, and 25, so that the desired test sequence is executed.

The output of the selected PROM is connected to a digital to analog converter 29 which converts the stored digital representation of amplitude in a PROM to analog representations of amplitude of wave motion. The output from converter 29 is applied as one of four inputs to an operational amplifier 31. A motion sensor 32, which is located in the water, also provides an input to operational amplifier 31 to cancel out small motions which might be in the body of water being used for making tests. Another input to amplifier 31 is provided from positioning potentiometer 33 which can be adjusted to position drum 22 to a position so that ample cable 21 is available from drum 22 to permit the desired excursion of sonobuoy 11. The fourth input to amplifier 31 is from feedback potentiometer 34 which is connected to drum 22 through a gear box 35, which permits the use of a single turn potentiometer having no end stops thus permitting greater freedom of drum rotation.

Operational amplifier 31 sums the four inputs to drive a direct current reversible motor 36 through a power amplifier 37. The polarities of the input signals to amplifier 31 are chosen so that the output from converter 29 and the output from potentiometer 34 form a position servomechanism system. Resistor 38 and capacitor 39 form a compensation network which provides the servomechanism system with the desired static and dynamic characteristics. A battery 41 furnishes power necessary to drive motor 36 and its controls, which are shown as box 42 in FIG. 2 of the drawing.

In operation, winch 18 and control panel 20 would normally be placed on shore and the speed of winch 18 would be regulated to wind cable 19 so that platform 17 would be towed at a desired speed to simulate a sea current. A desired sea state is then selected, by setting switch 26, and drum 22 is oscillated by motor 36. As drum 22 is oscillated, cable 21 is alternately wound and unwound from drum 22 and as cable 21 is attached to sonobuoy cable 12, hydrophone 13 is raised and lowered in a manner similar to its movement by actual sea waves. The simulation is very realistic since any waveform can be programmed into the PROMs. As a particular sea state can be characterized by its energy content of its component frequencies, a sea state can be created by a number of non-harmonic frequencies with certain amplitudes and phases. These can be synthesized and summed by a computer and the resultant amplitudes placed in the PROMs.

The use of a powerful torque motor 36 which is directly coupled to drum 22 minimizes both mechanical and electrical noise which would be picked up by the sonobuoy sensor. Also, the placement of winch 18 on shore, isolates noise from the sonobuoy sensor.

It can thus be seen that a simulation system for testing a sonobuoy is provided which imparts both horizontal and vertical motion to an operating sonobuoy thereby simulating ocean current and drift and wave action.

Obviously many modifications and variations of the present invention are possible in the light of the above teachings. It is therefore to be understood that the invention may be practiced otherwise than as specifically described.

We claim:

1. Apparatus for simulating a sea condition for a sonobuoy being tested in a relatively calm body of water, said sonobuoy comprising a float and a hydrophone connected to said float by an electrical cable comprising:

a floating platform,
means, comprising a winch placed on shore and a cable connecting said winch with said floating platform, for moving said floating platform at a predetermined speed for simulating a sea current,
a drum rotatably mounted on said floating platform,
a motion cable having one end attached to said electrical cable and the other end attached to said drum,
a reversible motor for rotating said drum, and
control means for regulating rotation of said reversible motor whereby said motion cable is wound upon said drum and unwound from said drum in a manner to simulate action of sea waves on said hydrophone, said control means comprising a plurality of programmable read-only memories for storing digital voltage values representing sea wave amplitudes and having a selector switch for selecting a desired memory.

2. Apparatus for simulating a sea condition for a sonobuoy being tested in a relatively calm body of water as set forth in claim 1 wherein outputs of said read-only memories are connected to a digital to analog converter and the output of said converter regulates said reversible motor.

* * * * *